United States Patent [19]
Knight, Sr.

[11] 4,316,695
[45] Feb. 23, 1982

[54] GARBAGE COMPACTION TRUCK

[76] Inventor: John W. Knight, Sr., Box 355, Rte. #5, Osage, Iowa 50461

[21] Appl. No.: 109,819

[22] Filed: Jan. 7, 1980

[51] Int. Cl.³ .............................................. B60D 1/00
[52] U.S. Cl. .................................... 414/517; 414/546
[58] Field of Search ................... 414/501, 517, 525 R, 414/539, 540, 546

[56] References Cited

U.S. PATENT DOCUMENTS

| | | | |
|---|---|---|---|
| 2,076,504 | 4/1937 | Ochsner | 414/525 |
| 2,487,411 | 11/1949 | Balbi | 414/525 X |
| 2,961,105 | 11/1960 | Shubin | 414/525 |
| 3,049,256 | 8/1962 | Urban | 414/501 |
| 3,802,585 | 4/1974 | Churchman | 414/517 |
| 3,890,889 | 6/1975 | Fishburne | 414/525 X |
| 3,921,839 | 11/1975 | Herpich | 414/525 X |
| 3,955,694 | 5/1976 | Herpich | 414/525 X |
| 4,096,956 | 6/1978 | Gaskin | 414/501 |
| 4,103,790 | 8/1978 | Neufeldt | 414/525 X |

Primary Examiner—Robert W. Saifer
Attorney, Agent, or Firm—Zarley, McKee, Thomte, Voorhees & Sease

[57] ABSTRACT

A garbage compaction apparatus includes a packer housing having a loose garbage receiving bin and a compacted garbage storage bin. A packing channel communicates with both bins and has a ram reciprocally movable therein for moving garbage toward and into the storage bin. A movable wall within the storage bin is biased toward the outlet opening of the packing channel such that upon the accumulation of sufficient garbage within the storage bin, the insertion of additional garbage by the ram causes the wall to retract against the urging of the biasing mechanism whereby the accumulated garbage in the storage bin is maintained in a compacted state. The packer housing may be supported on a vehicle with the receiving bin situated forwardly of the storage bin and with the packing tube extended rearwardly to introduce garbage into the storage bin at the rearward end thereof so as to force the movable wall forwardly within the storage bin.

8 Claims, 6 Drawing Figures

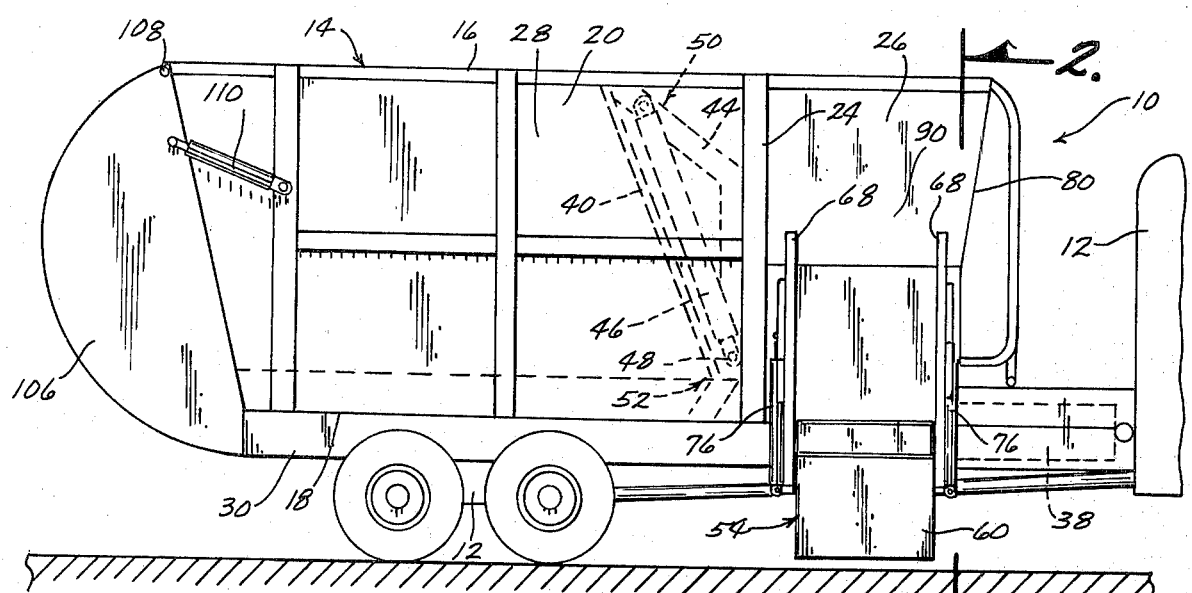
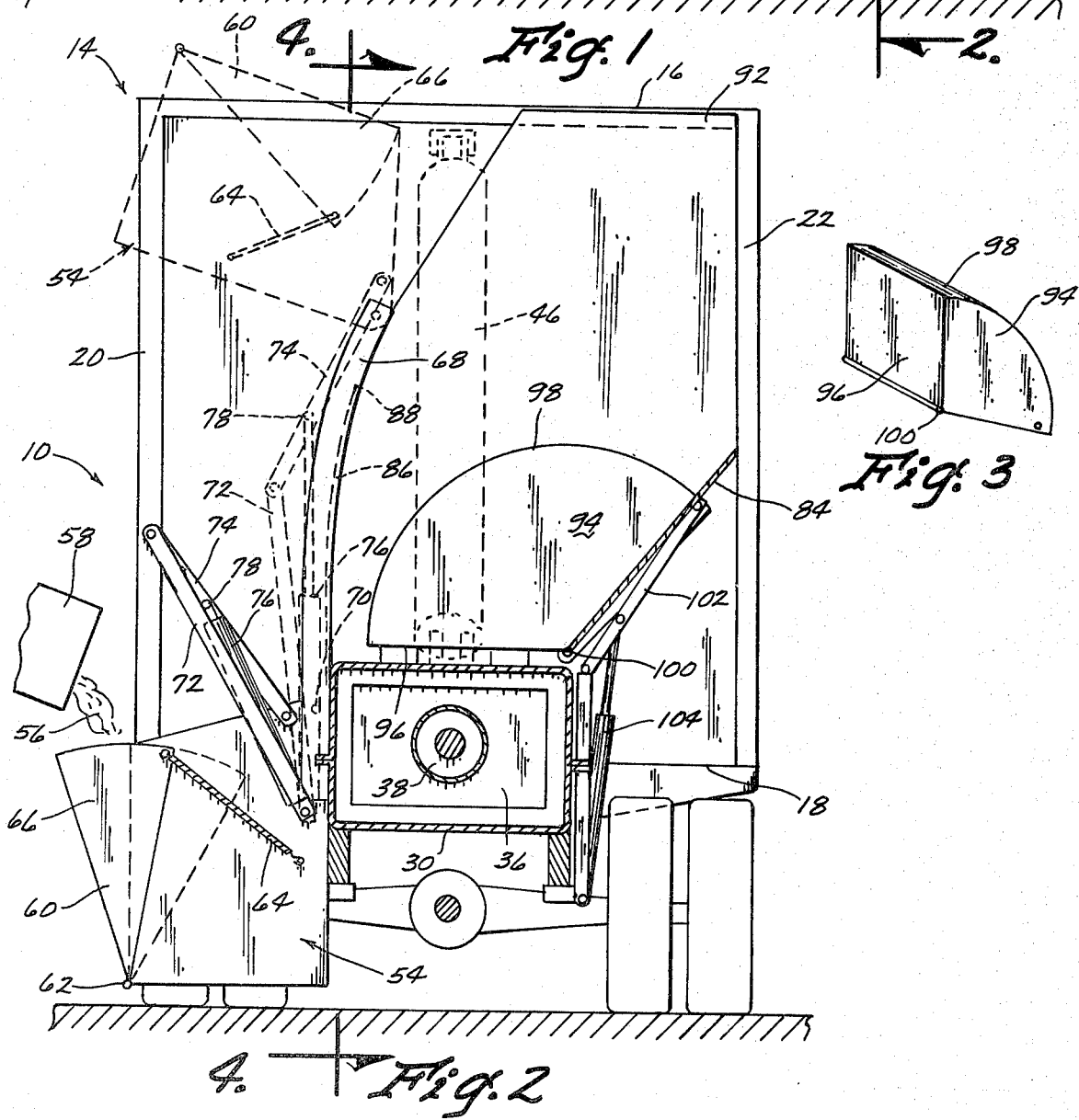

GARBAGE COMPACTION TRUCK

BACKGROUND OF THE INVENTION

The present invention is directed generally to garbage collection and compaction apparatus and more particularly to an apparatus wherein garbage is compacted upon introduction into a storage bin and maintained in a compacted state within the storage bin.

Garbage trucks have conventionally been constructed as including a small garbage receiving area adapted to be scraped clean by a packing blade which moves garbage from the receiving area into a storage compartment. There are several problems associated with the operation of such vehicles. A primary problem results from the action of the packing blade. Each time the packing blade reciprocates rearwardly to receive additional garbage from the receiving area, the accumulated garbage within the storage bin is permitted to expand. Because any given space will hold a substantially greater quantity of compacted garbage than loose garbage, the repeated expansion of garbage within the storage bin of a conventional truck necessarily reduces its load storage capacity.

Another problem relates to the position of the receiving area and packing blade rearwardly of the storage bin. In order to provide for unloading of the truck through the rearward end, the entire loading apparatus must be limited to a structure which can be pivoted upwardly and rearwardly with the end gate of the truck so that garbage may be ejected through the open rearward end of the truck.

Finally, wind can often be a problem when loading such trucks because of the position of the receiving area opening on the rear wall or sidewall of the truck. These and other problems are believed to be resolved by the garbage compaction apparatus of the present invention.

Accordingly, a primary object of the invention is to provide an improved garbage compaction apparatus.

Another object is to provide a garbage compaction apparatus in which garbage is maintained in a compacted state within the storage bin as additional garbage is introduced therein.

Another object is to provide a garbage compaction apparatus which is advantageously adapted for the unloading of garbage through a rearward end thereof.

Another object is to provide a garbage compaction apparatus wherein the opening to the garbage receiving area is shielded from the wind so as to facilitate loading of the apparatus.

Finally, another object is to provide a garbage compaction apparatus which is simple and rugged in construction and efficient in operation.

SUMMARY OF THE INVENTION

The garbage compaction apparatus of the present invention includes a packer housing including a loose garbage receiving bin situated forwardly of a compacted storage bin. An elongated packing tube underlies both bins and has an inlet opening in communication with the receiving bin and an outlet opening in communication with the storage bin. A ram is reciprocally movable within the packing tube between a retracted position wherein garbage may be received into the tube through the inlet opening and a compacting position wherein the garbage received in the tube is moved toward the outlet opening. A movable wall is supported within the storage bin and a biasing mechanism such as a hydraulic cylinder unit urges the wall in an advancing direction generally toward the outlet opening of the packing tube. Accordingly, the ram is operative to accumulate sufficient garbage within the storage bin that any further movement of garbage toward the outlet opening by the ram causes the accumulated garbage within the storage bin to move the movable wall in a retracting direction against the urging of the biasing means. As a result, accumulated garbage within the storage bin is maintained in a compacted state at all times. The packing tube preferably opens into the rearward end of the storage bin thereby causing accumulated garbage to force the movable wall forwardly toward the receiving bin. Emptying of the apparatus can thus be easily accomplished by simply pivotally raising the rear wall of the housing and advancing the movable wall to the rearward end of the storage bin. Finally, since the opening through which garbage is inserted into the receiving bin is situated below the top wall of the packer housing and spaced from both sidewalls, it is substantially shielded from the wind thereby to facilitate loading garbage into the receiving bin. The apparatus is preferably supported on a vehicle for use in collecting garbage from dispersed locations.

BRIEF DESCRIPTION OF THE DRAWINGS

FIG. 1 is a side elevational view of the garbage compaction apparatus of the invention in assembly relation with a truck chassis;

FIG. 2 is an enlarged partially sectional view as seen on line 2—2 in FIG. 1;

FIG. 3 is a detail perspective view of the prepacker of the invention;

DESCRIPTION OF THE PREFERRED EMBODIMENT

Figure 4:
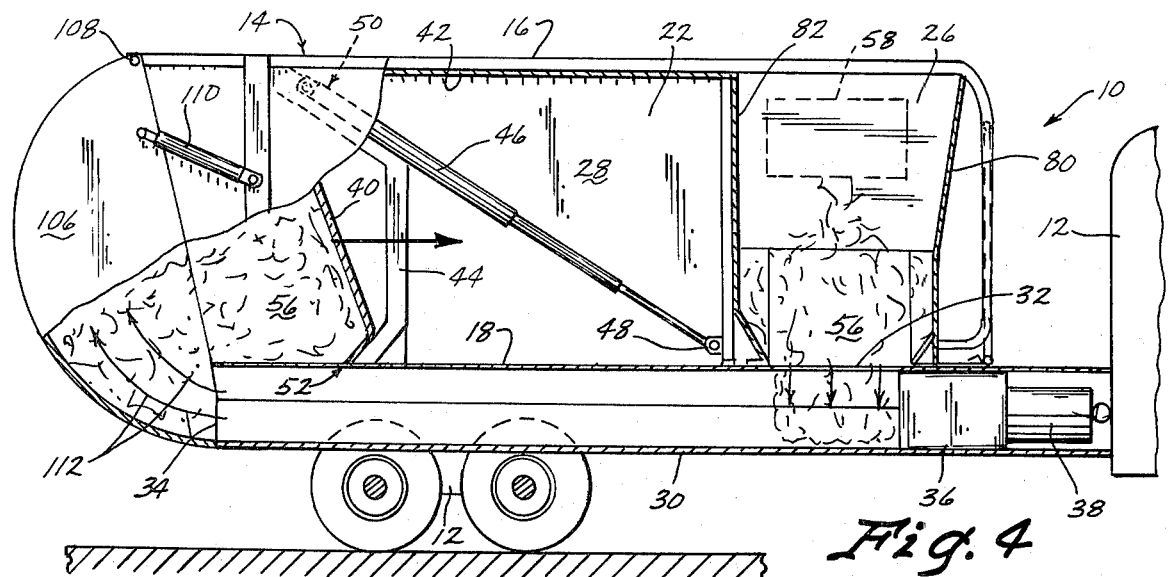
FIG. 4 is a side view of the apparatus with portions removed to show the ejector blade in an initial position.

The garbage compaction apparatus 10 of the present invention is shown in FIG. 1 supported on the chassis of a truck 12. The apparatus includes a packer housing 14 having a top wall 16, bottom wall 18 and opposite sidewalls 20 and 22. An intermediate wall 24 is extended transversely across the packer housing 14 to divide the same into a forward loose garbage receiving bin 26 and a rearward compacted garbage storage bin 28.

Figure 5:
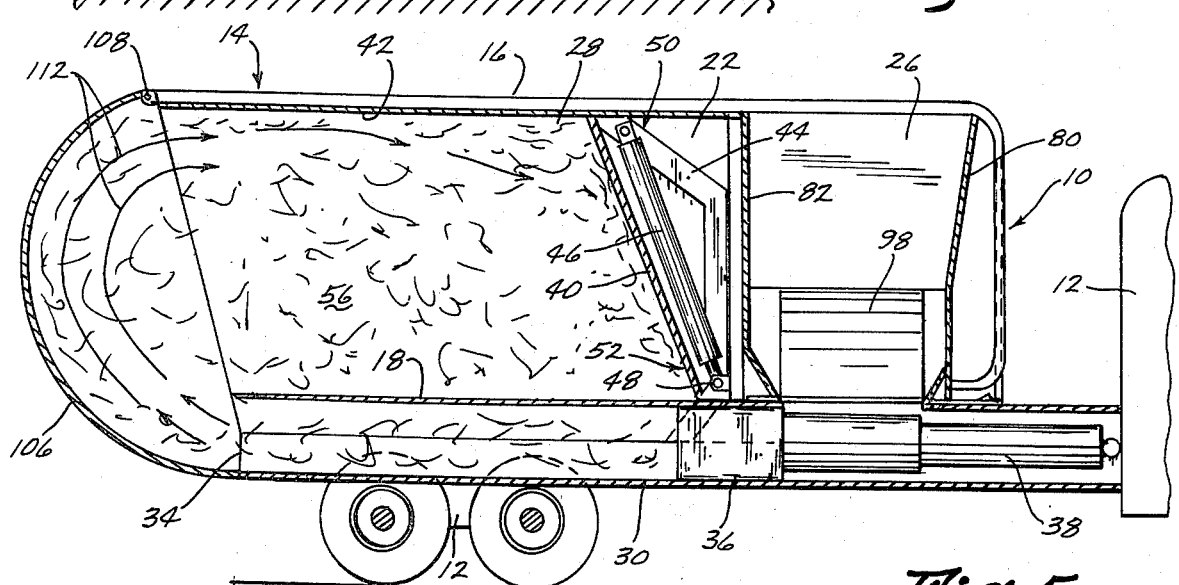
FIG. 5 is a side view of the invention showing the ejector blade in a retracted position with the storage bin fully loaded.
Figure 6:
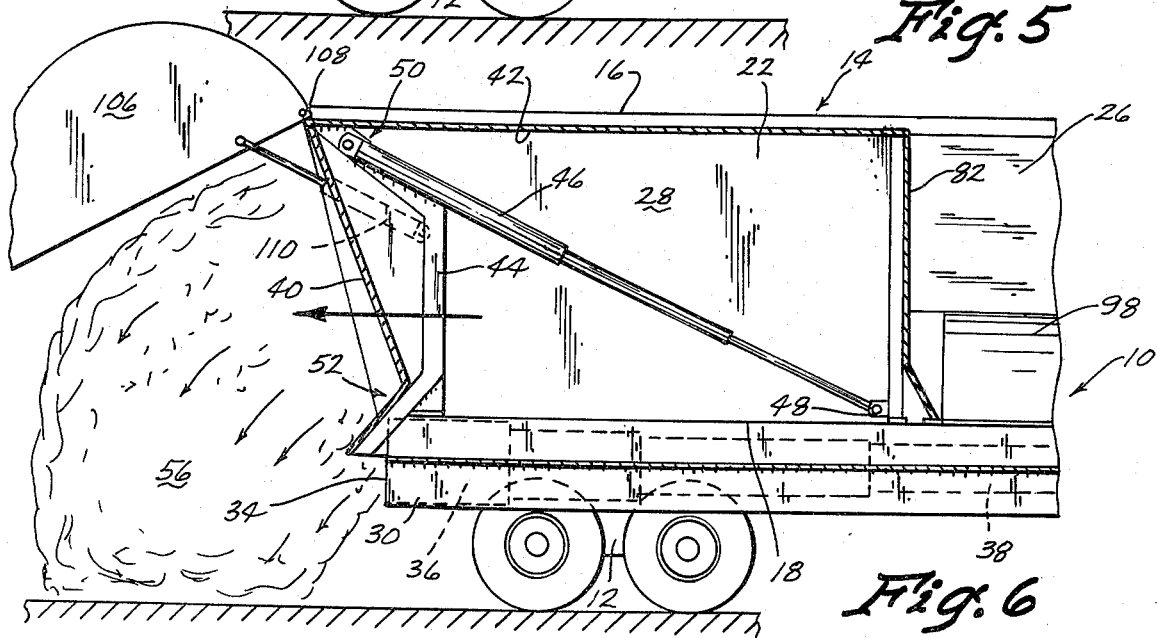
FIG. 6 is a side view of the invention showing the end gate raised and the ejector blade advanced rearwardly to empty the storage bin.

An elongated packing channel or tube 30 is situated below both bins and includes an inlet opening 32 in communication with the receiving bin 26 for receiving garbage therefrom by gravity. An outlet opening 34 at the rearward end of the packing tube 30 communicates with the storage bin 28 for delivering garbage thereto. A ram or packing cube 36 is reciprocally movable within the tube 30 between the retracted position of FIG. 4 wherein garbage may be received into the tube 30 through the inlet opening 32 and the compacting position shown in FIG. 5 wherein garbage received into the tube 30 is moved rearwardly toward the outlet opening 34. The means for reciprocally moving the ram 36 within the tube 30 includes a telescoping hydraulic packing cylinder unit 38.

A movable wall or ejector blade 40 is supported within the storage bin 28 by an elongated track 42 on the underside of top wall 16, for example, for fore and aft movement of the ejector blade within the storage bin. A brace assembly 44 is connected to the rearward side of the ejector blade for reinforcement. An elongated telescoping hydraulic cylinder unit 46 is pivotally connected at one end to an upper portion of the ejector blade 40 and pivotally connected at its opposite end to a suitable mounting bracket 48 on the packer housing 14 so that the ejector blade 40 is advanced rearwardly within the storage bin in response to extension of hydraulic cylinder unit 46. Note that the ejector blade 40 includes a downwardly and forwardly inclined upper portion 50 and a downwardly and rearwardly inclined lower portion 52.

A garbage receptacle 54 is carried on one side of the apparatus 10 for receiving garbage 56 or the like from storage cans 58. To facilitate loading, the exterior sidewall 60 of receptacle 54 is pivotally mounted along its lower edge as at 62 for outward movement of the exterior wall 60 against the urging of springs 64 which are each connected to a respective generally wedge-shaped side flange 66.

The apparatus for supporting receptacle 54 comprises a lift apparatus including an upright track 68 to which the upper interior edge of the receptacle is connected as at 70. The lift apparatus further includes a first linkage 72 pivotally connected to the base of track 68 and pivotally connected at its opposite end to a second linkage 74, the opposite end of which is pivotally connected to the garbage receptacle 54 at a position adjacent to but exteriorly of the track connection 70. A hydraulic cylinder unit 76 is also pivotally connected to the base of truck 68 and to a medial position on second linkage 74 as at 78 such that upon extension of the hydraulic unit 76, the garbage receptacle 54 is moved from the solid to dotted positions therefor in FIG. 2 for loading garbage into the receiving bin 26. As receptacle 54 is lifted, it is seen that it is simultaneously partially inverted for dumping garbage therefrom into the receiving bin 26 by gravity.

Receiving bin 26 is defined by front and rear walls 80 and 82 respectively, both of which include inclined lower end portions which converge toward inlet opening 32. Likewise, referring to FIG. 2, receiving bin 26 is exteriorly defined by sidewall 22 and a downwardly and inwardly inclined wall portion 84 and interiorly defined by an upstanding arcuate wall 86 which follows the contour of vertical track 68. Note that wall 86 terminates at 88 so that the opening 90 through which garbage is inserted into the receiving bin 26, is situated below top wall 16 and in spaced-apart relation from both sidewalls 20 and 22 so as to be substantially shielded from the wind. Receptacle 54 of course further shields opening 90 and windshield portion 92 of top wall 16 adds further protection.

Garbage within the receiving bin 26 initially falls through inlet opening 32 by gravity to fill a portion of the packing tube 30 forwardly of the ram 36. Prior to actuation of the ram 36, however, a prepacker 94 (FIGS. 2 and 3) having a packing surface 96 is pivotally moved from an open position wherein packing surface 96 is substantially aligned with wall portion 84, to a closed position wherein packing surface 96 overlies inlet opening 32 as shown in FIG. 2 whereby loose garbage in the path of movement of the packing surface 96 is forced through the inlet opening 32 and compacted into the packing tube 30. Prepacker 94 includes an arcuate trailing surface 98 to prevent the entry of garbage behind packing surface 96 when the same is pivoted to its closed position. Prepacker 94 is pivotally supported at 100. A linkage 102, which is pivotally anchored at its lowered end and pivotally connected to the prepacker at its opposite end is operatively connected to a hydraulic cylinder unit 104 for moving the prepacker between its open and closed positions.

Finally, for purposes of unloading the storage bin, the rearward wall of the packer housing comprises an end gate 106 which is pivotally connected to the packer housing adjacent the top end thereof as at 108 for opening and closing pivotal movements of the end gate by the end gate cylinder 110.

In operation, loose garbage 56 is deposited into the receptacle 54 in its lowered position as hown in FIG. 2, whereupon hydraulic cylinder unit 76 is extended to lift the receptacle 54 to its dotted line position in FIG. 2, whereupon garbage is dumped into the receiving bin 26 through opening 90. Loose garbage falls freely into the packing tube 30 through inlet opening 32 and prepacker 94 forces additional garbage through the inlet opening prior to actuation of ram 36. Upon extension of the packing cylinder 38, ram 36 is moved to its packing position of FIG. 5 wherein garbage is moved toward the outlet opening 34. As this process is repeated, garbage accumulates within the storage bin 28. As soon as the space between end gate 106 and ejector blade 40 becomes filled with garbage, the introduction of additional extruded compacted garbage from packing tube 30 exerts a severe pressure on ejector blade 40. A pressure relief valve on ejector cylinder 46 then permits the blade 40 to move gradually forwardly as additional compacted garbage is extruded from the packing tube 30. Because the lower portion of end gate 106 is substantially aligned with the rearward end of the packing tube 30, the extruded garbage is directed along the inner periphery of end gate 106 upwardly and forwardly into the storage bin as indicated at arrows 112. When the accumulated compacted garbage forces the ejector blade to its full forward position of FIG. 5, the truck 12 is driven to a dumping site where end gate 106 is raised by cylinder 110. Ejector blade 40 is then moved rearwardly by cylinder 46 to empty garbage from the storage bin and packing cylinder 38 is further extended to advance ram 36 to the rearward end of the packing tube for emptying garbage from the tube as well.

Upon contraction of the packing cylinder 38 and closing of the end gate 106, the apparatus is prepared for further garbage collection as described above.

Thus there has been shown and described a garbage compaction apparatus which accomplishes at least all the stated objects.

I claim:
1. A garbage compaction apparatus comprising,
   a packer housing including a top wall, bottom wall, opposite side walls and forward and rearward end walls, said housing including a compacted garbage storage bin and a loose garbage receiving bin situated forwardly of said storage bin,
   a packing channel having an inlet opening in communication with said receiving bin for receiving garbage therefrom and an outlet opening in communication with said storage bin for delivering garbage thereto,
   said packing channel comprising an elongated tube extended longitudinally of said storage bin adjacent said bottom wall, said outlet opening comprising an open rearward end of said tube and being positioned adjacent a rearward portion of said storage chamber, a ram reciprocally movable within said packing channel, means for moving said ram between a retracted position wherein garbage may be received into said channel through said inlet opening and a compacting position wherein said garbage received in said channel is moved toward said outlet opening, said outlet opening facing said rearward wall and said rearward wall comprising an arcuate generally semi-cylindrical surface having a lower end in general alignment with said tube whereby garbage extruded rearwardly through said outlet opening by said ram is directed along the periphery of said rearward wall upwardly and forwardly into said storage bin, a movable wall within said storage bin, means for biasing said movable wall against retracting movement in a forward direction, said ram being operative, in response to reciprocal movement thereof, to accumulate sufficient garbage within said storage bin that rearward movement of additional garbage toward said outlet opening by said ram forces the accumulated garbage within said storage bin upwardly and forwardly to move said movable wall in a retracting forward direction against the urging of said biasing means whereby said accumulated garbage in said storage bin is maintained in a compacted state.

2. The apparatus of claim 1 wherein said rearward wall is hingedly connected to said packer housing adjacent said top wall whereby said rearward wall may be rotated rearwardly and upwardly for the ejection of compacted garbage from said storage bin upon movement of said movable wall in an advancing direction by said biasing means.

3. The apparatus of claim 1 wherein said biasing means comprises a hydraulic cylinder unit connected to said movable wall at one end and connected to said packer body at the other end whereby said movable wall is moved in an advancing direction in response to expansion of said hydraulic cylinder means.

4. The apparatus of claim 4 wherein said packer housing is supported on a vehicle including an elongated frame and wheel means for supporting said frame.

5. The apparatus of claim 1 further comprising a prepacker device pivotally mounted within said receiving bin adjacent said opening and means for pivotally moving said prepacker from an open position wherein loose garbage may be received into said packing channel by gravity and a closed position overlying said opening whereby loose garbage in the path of movement of said prepacker is forced through said opening and compacted into said channel.

6. The apparatus of claim 1 wherein said receiving bin has an opening adjacent said top wall, and further comprising a lift apparatus for loading garbage into said receiving bin through said opening.

7. The apparatus of claim 1 wherein said receiving bin has an opening situated below said top wall and in spaced relation from said side walls whereby said opening is substantially shielded from the wind.

8. The apparatus of claim 1 wherein the area of said outlet opening is substantially less than the rear surface area of said movable wall.

* * * * *